US008417920B2

(12) United States Patent
Stevens et al.

(10) Patent No.: US 8,417,920 B2
(45) Date of Patent: Apr. 9, 2013

(54) MANAGEMENT OF SPECULATIVE TRANSACTIONS

(75) Inventors: Ashley Miles Stevens, Cambridge (GB); Daren Croxford, Cambridge (GB)

(73) Assignee: ARM Limited, Cambridge (GB)

( * ) Notice: Subject to any disclaimer, the term of this patent is extended or adjusted under 35 U.S.C. 154(b) by 1479 days.

(21) Appl. No.: 12/004,475

(22) Filed: Dec. 21, 2007

(65) Prior Publication Data

US 2009/0164998 A1  Jun. 25, 2009

(51) Int. Cl.
*G06F 9/30* (2006.01)

(52) U.S. Cl.
USPC .......................................................... 712/220

(58) Field of Classification Search ........................ None
See application file for complete search history.

(56) References Cited

U.S. PATENT DOCUMENTS

| 6,654,860 | B1 * | 11/2003 | Strongin et al. | 711/154 |
| 6,961,847 | B2 * | 11/2005 | Davies et al. | 712/235 |
| 7,543,282 | B2 * | 6/2009 | Chou | 717/151 |

* cited by examiner

*Primary Examiner* — Robert Fennema
(74) *Attorney, Agent, or Firm* — Nixon & Vanderhye P.C.

(57) ABSTRACT

Circuitry for receiving transaction requests from a plurality of masters and the masters themselves are disclosed. The circuitry comprises: an input port for receiving said transaction requests, at least one of said transaction requests received comprising an indicator indicating if said transaction is a speculative transaction; an output port for outputting a response to said master said transaction request was received from; and transaction control circuitry; wherein said transaction control circuitry is responsive to a speculative transaction request to determine a state of at least a portion of a data processing apparatus said circuitry is operating within and in response to said state being a predetermined state said transaction control circuitry generates a transaction cancel indicator and outputs said transaction cancel indicator as said response, said transaction cancel indicator indicating to said master that said speculative transaction will not be performed.

20 Claims, 5 Drawing Sheets

MANAGEMENT OF SPECULATIVE TRANSACTIONS

BACKGROUND OF THE INVENTION

1. Field of the Invention

The field of the invention relates to data processing and in particular to the processing of speculative transaction requests.

2. Description of the Prior Art

It is known in the prior art to generate speculative transaction requests to improve the performance of a system. For example, there may be branch prediction logic associated with a processor which predicts which way a branch in an instruction stream may go and performs the prefetching of instructions and/or the loading of required data into the cache for the predicted branch before the branch has actually been taken. Thus, if the prediction is correct, the time needed to perform the instructions within the branch is significantly reduced, whereas if the prediction is not correct then the preloaded instructions and data are not required and the power and resources used to perform these "speculative" steps have in effect been wasted.

Performing speculative transactions can significantly increase the performance of a system, however, they can also cause additional loading to that system and may also increase power consumption.

In some processors such as Cortex-R4 developed by ARM® (of Cambridge UK) it is known for a master that generates a speculative read to drop this read, i.e. not send the request, if it decides that the bus it is to use is busy or the memory too slow. It can only judge the activity of the system from its own transaction requests, it knows nothing of the activity of other masters in the system.

It would be advantageous to be able to control the processing of speculative requests such that they can be performed where an increase in performance can be achieved and is desirable, but can be avoided where additional processing is not desirable.

SUMMARY OF THE INVENTION

A first aspect of the present invention provides circuitry for receiving transaction requests from a plurality of masters, said circuitry comprising: a port for receiving said transaction requests, at least one of said transaction requests received comprising an indicator indicating if said transaction is a speculative transaction; a port for outputting a response to said master said transaction request was received from; and transaction control circuitry; wherein said transaction control circuitry is responsive to a speculative transaction request to determine a state of at least a portion of a data processing apparatus said circuitry is operating within and in response to said state being a predetermined state said transaction control circuitry generates a transaction cancel indicator and outputs said transaction cancel indicator as said response, said transaction cancel indicator indicating to said master that said speculative transaction will not be performed.

Although the performance of speculative transactions can significantly increase performance they can also increase power consumption and resource loading. Their usefulness is dependent to some extent on the operating state of the data processing apparatus. Realising this and using the state of the data processing apparatus as a factor when determining whether or not to cancel a speculative transaction can be advantageous.

Although it is known for a master not to generate speculative transaction requests when it exceeds a certain number of pending non-speculative requests, more centralised control of speculative transactions has not previously been available. One reason for this is that it is not generally possible for a device receiving a transaction request from a master to know that that request is speculative. Furthermore, if the transaction requested is to not to be performed then the master should be made aware of this otherwise the master will continuously be waiting for the pending transaction to complete. This information is transmitted to the master in the form of an abort response, however the master does not need to do any error handling code in response to the abort response, it simply deletes the information in the bus interface unit indicating that this transaction is pending. Thus, a dynamic decision making technique is disclosed that allows speculative transactions to be cancelled or performed on a case by case basis depending on a state of the data a processing apparatus.

The present invention therefore addresses the problems of the prior art by providing circuitry that can not only recognise speculative transaction requests but can also cancel them in dependence upon the state the data processing apparatus is in. Thus, it can determine when the operating state of the system is such that the processing of speculative transactions would be desirable and can in such cases allow them to be processed. It can also determine states where it would not be desirable to process the transactions and in such cases it can act to cancel them. It can then transmit the information that the request has been cancelled to the master that sent the original request and thereby avoid problems associated with indefinitely pending transactions at the master. Thus, the performance of the system can be tailored to its operating state by the provision of an additional control mechanism for cancelling speculative transactions.

In some embodiments, said predetermined state is a low power state.

A data processing apparatus may operate in several different power states, for example, a high power state such as mains, lower power states such as full battery, half battery or low battery, or a lower power state where maximum performance is not required (for example for a mobile phone in standby mode rather than running a game). Thus, in a high power state performance is all important whereas in one or more lower power states conservation of energy becomes important. As noted previously, speculative transactions can increase the performance of an apparatus and as such in a high power mode it is advantageous to perform them, while in one or more of the lower power modes where power conservation is more important it may be advantageous not to perform speculative transactions and cancel them when they are requested.

In some embodiments, said circuitry comprises a register for storing a low power indicator, said circuitry determining said state of said data processing apparatus in response to a value stored in said register.

The circuitry may determine the power state of the data processing apparatus in a number of ways but in some ways it is determined from a low power indicator stored in a register within the circuitry.

In other embodiments, said circuitry comprises an input from a power controller said input being adapted to receive a signal indicating a power state of said data processing apparatus, said circuitry determining said state of said data processing apparatus in response to said power state signal received from said power controller.

In some embodiments, said predetermined state is a busy state.

Alternatively or additionally to the predetermined state being a power state of the device, it may also be a state indicating how busy the device is. If the device is very busy such that there is not much resource available then it may be more advantageous to cancel speculative transactions rather than adding them to what are already very long queues.

In some embodiments said predetermined state is dependent upon a power state of said circuitry and an activity state of said circuitry, said circuitry comprising a plurality of power states and a plurality of activity states, said predetermined state comprising a low power state, a high activity state and a combination of a lower power state and a higher activity state.

The circuitry may have a number of power states and activity states and the predetermined state where speculative transaction are cancelled may depend on a combination of these states. Thus, the predetermined state may be one of the very low power states, one of the very busy states or a combination of one of the lower power states and one of the higher activity states. Thus, where the circuitry is quite busy and wishes to conserve power, it may be advantageous to cancel the speculative transactions.

In some embodiments, said circuitry comprises an interconnect, while in other embodiments, said circuitry comprises a memory controller.

One advantage of the circuitry comprising an interconnect is that the cancellation of the speculative transaction is determined within the interconnect which avoids the need to broadcast the transaction request and the cancellation indicator further than this interconnect, thereby potentially saving power.

In some embodiments, said memory controller comprises a pending queue of pending transactions, said data processing apparatus being in said busy state when said queue comprises at least one of more than a predetermined number of transactions and more than a further predetermined number of non-speculative transactions in said pending queue.

Although, the busy state of the data processing apparatus can be determined in a number of ways, in some embodiment it is determined in dependence upon the length of a pending queue within the memory control circuitry. The length of the pending queue may be determined from the number of all the transactions pending in the queue or it may be the number of non-speculative transactions in the queue that is used or it may be both of these. In other embodiments, the activity state of the data processing apparatus may be determined from circuitry that monitors a bus's activity.

In some embodiments, in response to said state not being said predetermined state said memory controller provides said speculative transaction request with a low priority status and puts said transaction in said pending queue in a position dependent upon its priority and in response to said state changing to said predetermined state while said speculative request is still in said queue, said memory controller cancels said transaction and generates said transaction cancel indicator and outputs said transaction cancel indicator to said master.

If the data processor is not within the predetermined state when it receives a speculative transaction request then in some embodiments the memory controller provides the speculative transaction request with a low priority status and inserts it in the pending queue at a point dependent upon this low priority status. It should be noted that the pending queue contains a list of transactions stored in the "queue" in the order they are to be performed. Transactions therefore join the "queue" at different points depending on their priority status. A transaction may stay in the pending queue for some while, particularly if higher priority transactions are generated while it is in the queue. Furthermore, in some embodiments a transaction may be deleted from the queue if it is determined that it has been in the queue for longer than a predetermined amount of time. Thus, if the state of the data processing apparatus changes to the predetermined state, for example it enters low power mode, while this speculative request is still in the queue then the memory controller cancels the transaction and generates a transaction cancel indicator. Thus, in some embodiments in addition to cancelling the transaction request if it is generated when the data processing apparatus is in a predetermined state, it may also be cancelled later if the data processing apparatus enters the predetermined state while the transaction is still pending.

In some embodiments, said memory controller is responsive to said speculative transaction request and to said state being said predetermined state to open a row in said memory comprising an address to be accessed by said speculative transaction request and to cancel said transaction and to generate said transaction cancel indicator.

Although, the speculative transaction requests may just be cancelled, in some embodiments in response to the data processing apparatus being in the predetermined state, in other embodiments a compromise of opening a row in the memory that the transaction was to access is performed and the transaction request is cancelled. Thus, not all of the power required or the resources needed are used to perform the transaction, however, some are used such that the row is open and thus, if the speculative transaction becomes a true transaction and is later generated, the row will be open and the performance of the transaction is improved.

A further aspect of the present invention provides a master for generating speculative and non-speculative transaction requests and for generating a speculative indicator to indicate requests that are speculative, said master comprising a bus interface unit and an output port for outputting said requests, said speculative requests being output with said speculative indicator, said master comprising a port for receiving a response to said requests, said master being responsive to a response indicating said speculative request has been cancelled to delete said data relating to said cancelled transaction request from said bus interface unit.

In some embodiments, said speculative indicator is output from said master as part of a field identifying said master.

Although the speculative indicator can be output in a number of forms, in some embodiments it is output as part of a field identifying the master. This can have advantages when prioritizing the order that transactions are to be performed. Generally transactions from a same master are prioritized in the order that they are received, in other words, there is no re-ordering of transactions from the same master. If speculative transaction requests are given a particular master field then they are not bound by the same ordering requirements as other transaction requests from that master and as such they can be given a very low priority.

A yet further aspect of the present invention provides a data processing apparatus comprising at least one master according to a further aspect of the invention, circuitry according to a first aspect of the present invention and an interface connecting said at least one master and said circuitry.

In some embodiments the transaction cancel indicator comprises a predetermined encoding transmitted via said interface for example as a unique response bus encoding, while in other embodiments said interface comprises at least one sideband signal line for communicating said transaction cancel indicator to said at least one master.

It may be that there are not enough signal lines on the interface to provide new encodings to indicate this new information and in which case a new sideband signal line is provided in the interface such as a signal can be sent.

Furthermore, in some embodiments said interface comprises a further sideband signal line for communicating said speculative transaction indicator as a sideband signal to said transaction request.

A still further aspect of the invention provides a method of controlling the processing of speculative transactions comprising the steps of:

generating a speculative transaction request;

transmitting said transaction request along with an indicator indicating that said transaction request is speculative;

receiving said transaction request and said indicator;

determining a state of a data processing apparatus for processing said transaction; and in response to said state being a predetermined state generating a transaction cancel indicator and outputting said transaction cancel indicator as a response to said transaction; and in response to said state not being said predetermined state performing said transaction and outputting a result of said transaction.

The above, and other objects, features and advantages of this invention will be apparent from the following detailed description of illustrative embodiments which is to be read in connection with the accompanying drawings.

DESCRIPTION OF THE PREFERRED EMBODIMENTS

Figure 1:
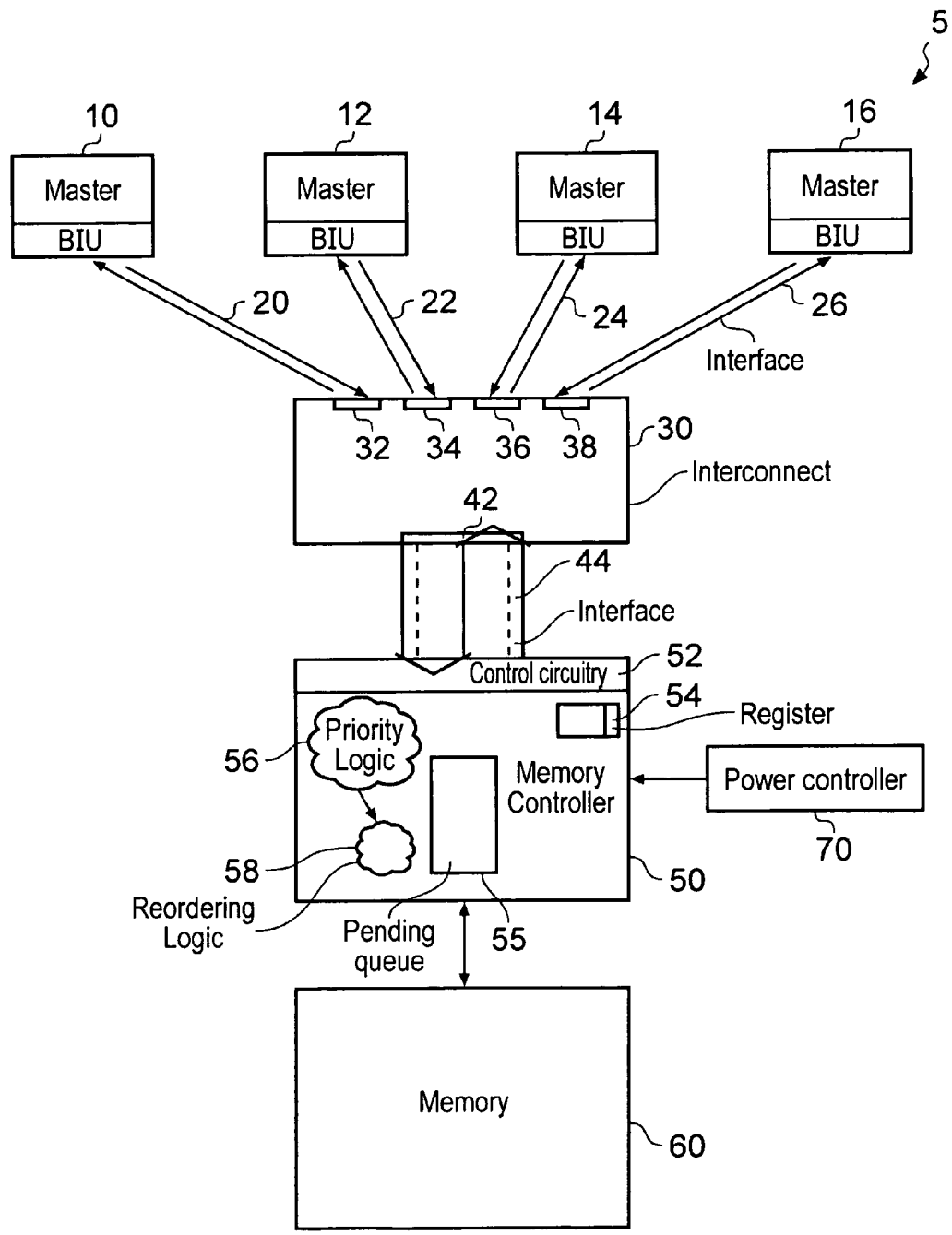
FIG. 1 shows a data processing apparatus comprising a plurality of masters, an interconnect a memory controller and a memory according to an embodiment of the present invention.

FIG. 1 shows a data processing apparatus 5 according to an embodiment of the present invention. Data processing apparatus 5 comprises a number of masters 10, 12, 14, 16 such as processors, accelerators, DMA controllers, video or LCD controllers or DSPs which generate transaction requests and transmit them via interfaces 20, 22, 24, 26 to interconnect 30. Interconnect 30 then receives these transaction requests at ports 32, 34, 36 and 38 and transmits them to memory controller 50 which accesses memory 60. Each master 10, 12, 14, 16 can generate non-speculative transaction requests and at least some of them can generate speculative transaction requests. These speculative transaction requests might be generated by prefetch logic with branch prediction within the master or they might be generated by some sort of prediction logic within a bus interface unit on the master. A master that can generate speculative transaction requests will transmit an indicator along with the request indicating whether the transaction request is a speculative transaction request or not. This information may be sent as a sideband signal to the transaction request on the interfaces 20, 22, 24, 26 or it can be sent as part of the master identifier that identifies each master. Interconnect 30 receives at one of its ports 32, 34, 36, 38 the transaction request and transmits it along with the master identifier and information relating to the port it was received at to memory controller 50 via port 42 and interface 44. The additional information relating to whether or not the instruction is speculative, which may be sent as a sideband signal or may be part of the master identifier or some other encoding is also sent to memory controller 50 over interface 44.

Memory controller 50 comprises control circuitry 52 for controlling the processing of speculative transactions. This control circuitry 52 recognises if a transaction request is a speculative transaction and if it is determines whether the processing apparatus is in a low power or high power state. This can be determined from a value stored in register 54 which is updated with information sent from power controller 70.

If circuitry 52 determines that the processing apparatus 5 is in a low power state then when a speculative instruction is received it cancels this transaction and sends information relating to it being cancelled back to interconnect 30 over bus 44. This information is sent along with the master identifier such that the interconnect can then route this information back to the appropriate master. The pending transaction information that is stored in the bus interface unit of the master is then deleted for that transaction and this stops the bus interface unit from clogging up.

If register 54 shows that the data processing apparatus 5 is in a high power mode then the speculative transaction is sent to priority logic 56 where it is given a certain priority and is sent via re-ordering logic 58 to pending queue 55. As it is a speculative instruction it is given a very low priority and thus generally joins the back of the queue. Later transactions that are generated and have a higher priority than a speculative transaction will join the queue ahead of these transactions.

The memory controller 50 can be configured to respond to a switch from high power mode to low power mode to look at the transactions pending in the queue and in response to detecting any with the lowest priority which would indicate that they were speculative transactions, it can delete these speculative transactions from the queue and generate a transaction cancel indicator to send via interconnect 30 to the master that generated the transaction such that the pending transaction information relating to that transaction in the bus interface unit can be deleted.

With regard to the re-ordering logic 58 the pending queue is generally ordered in response to the priority of the transactions. Different masters may have different priorities and as such the master identifier field may be used by the priority logic to generate a priority. Furthermore, transactions from a particular master are generally processed in order. If the speculative transaction is given its own master identifier field that identifies both the master and the fact that it is a speculative instruction then it can be provided with the lowest priority and it is not constrained to follow the ordering of the other non-speculative transactions received from that particular master as it has a different master identifier.

Figure 2:
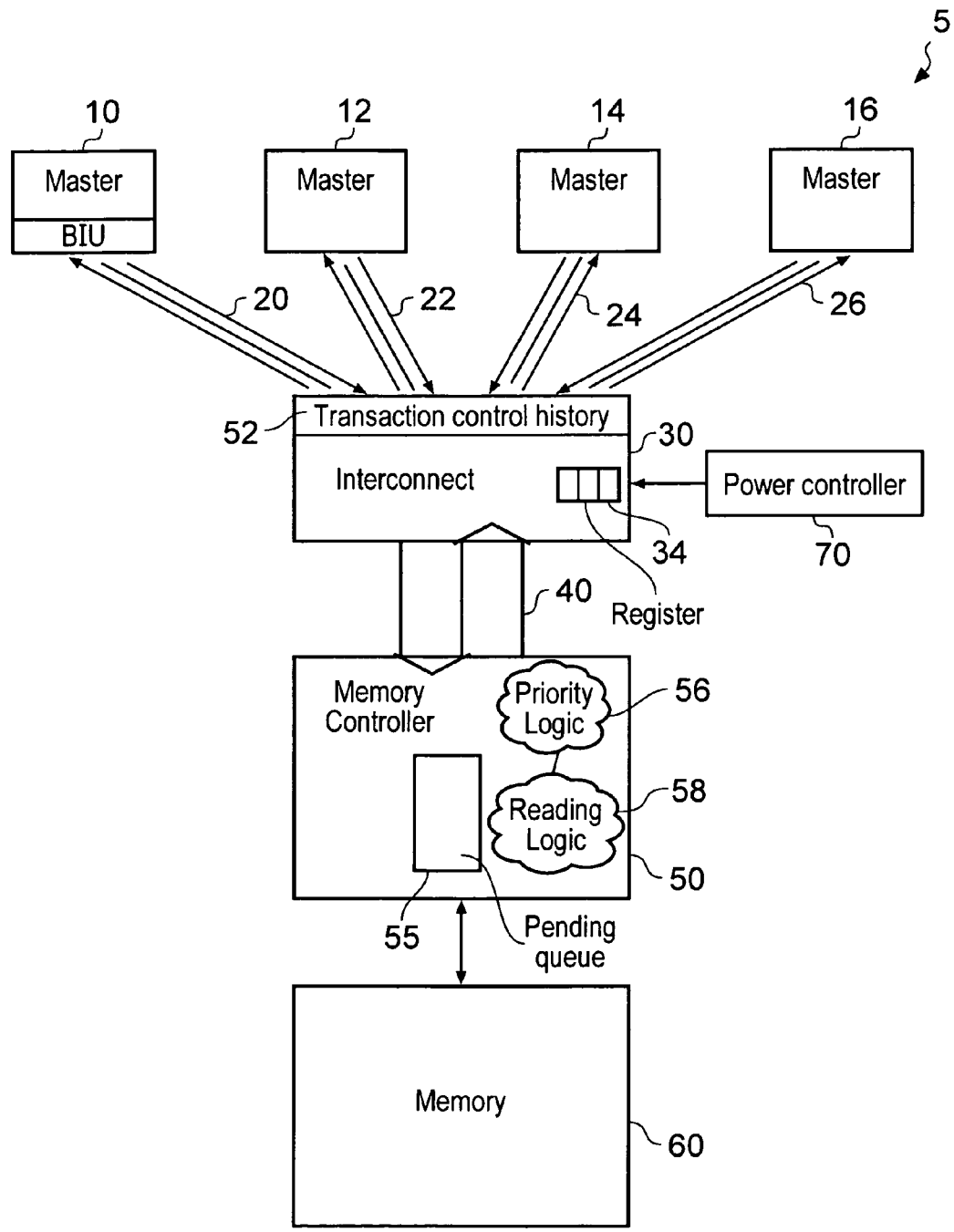
FIG. 2 shows a data processing apparatus according to a further embodiment of the present invention.

FIG. 2 shows an alternative embodiment of the present invention where the transaction control circuitry 52 is provided within interconnect 30. Interconnect 30 also comprises a register 34 for holding a value indicating the power state of the processing apparatus and a value indicating how busy the data processing apparatus is. In some embodiments, the speculative transactions are treated in different ways depending both on the power state of the data processing apparatus and on how busy it is. Thus, if the data processing apparatus is busy and/or in a low power state speculative transactions are cancelled whereas if it is in a high power state and is not busy then they are processed. In this embodiment, register 34 has an indicator indicating if the processing apparatus is in low power mode and a further indicator indicating the activity of the processing apparatus 5. It should be noted that in this embodiment there are only two power states and two activity states and thus, a single value for each in register 34 can indicate these states. In other embodiments there may be several power states and several activity states in which case, the register 34 would have several indicator bits for the power states and for the activity states. In such an embodiment speculative transactions would be cancelled in response to a very busy state, a very low power mode, or a combination of a fairly busy state and lower power mode.

In this embodiment, the activity is determined in response to the length of pending queue 55 within memory controller 50. Thus, a signal is sent from the memory controller when the pending queue exceeds a certain length and a further signal is sent when it falls below this length. This signal acts to set the "busy" value in register 34. In other embodiments where interconnects track outstanding transactions, the busy signal may be generated inside the interconnect.

In this apparatus the information that the transaction request is speculative is sent as a sideband signal to the transaction request from the master to the interconnect. The control circuitry 30 responds to this sideband signal to cancel the transaction if it is speculative and the system is in low power or busy mode. It does this by sending a response to the master indicating that the transaction will not be processed. By cancelling the transaction in the interconnect, it is not broadcast all the way to the memory controller which may help to reduce power consumption. In some embodiments in addition to cancelling the transaction it opens the row in the memory that the data access transaction was addressing although it does not perform the rest of the transaction. This means that if the speculative transaction is later performed as a non-speculative transaction the row may already be open.

In response to the system being in high power or non-busy mode, the speculative transaction is forwarded to the memory controller via interconnect 40. A sideband signal may be added to it to indicate that it is speculative and this allows priority logic 56 and reordering logic 58 to give it a very low priority so that it joins the back of the queue.

It should be noted that in alternative embodiments, the interconnect and memory controller may be a single unit with the speculative instruction control circuitry being provided within this single unit.

Figure 3:
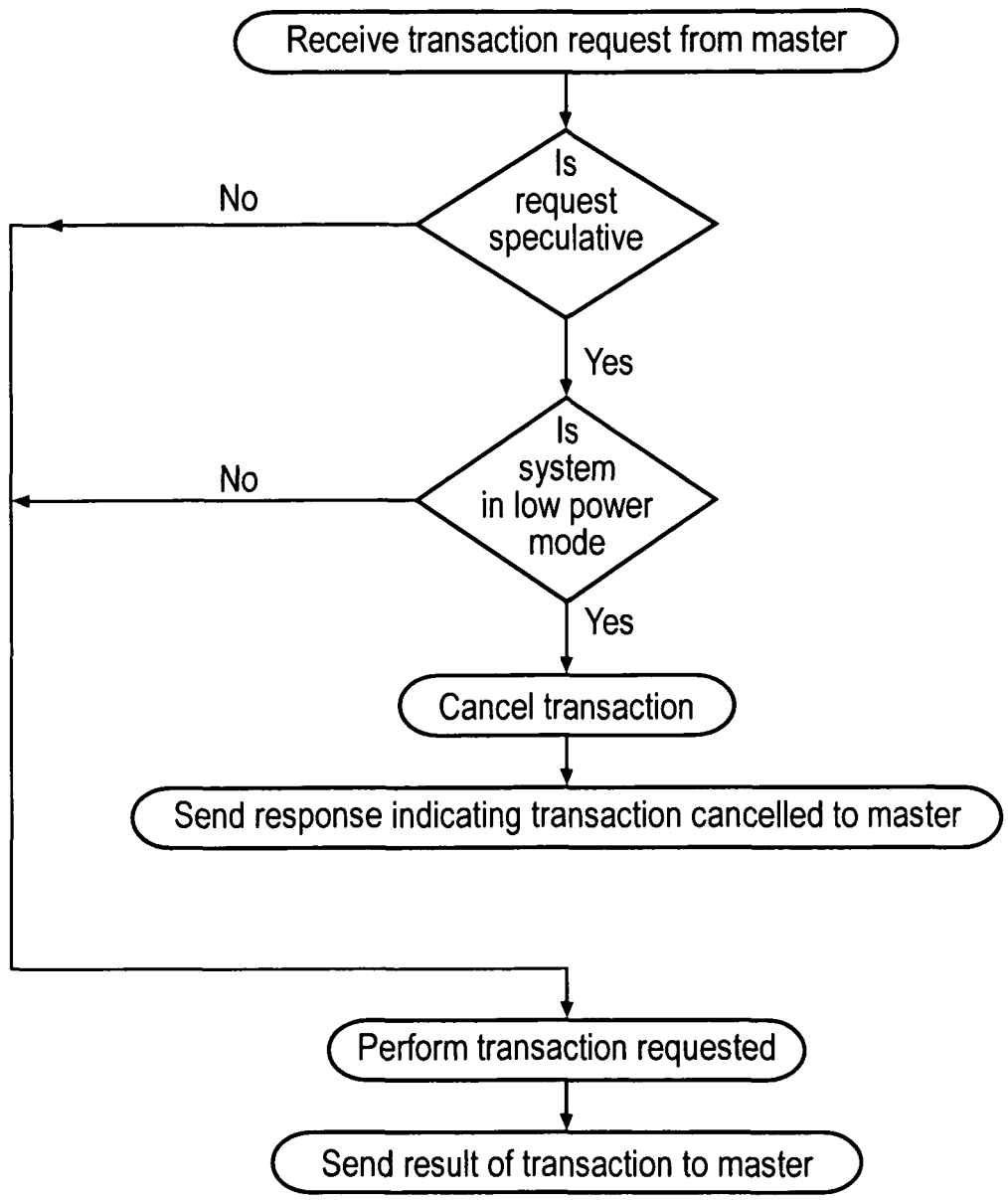
FIG. 3 shows a flow diagram indicating the steps performed by a memory controller according to an embodiment of the present invention.

FIG. 3 shows a flow diagram indicating the steps performed by a memory controller according to an embodiment of the present invention. Initially a transaction request is received from a master. It is then determined if the request is speculative or not. If it is not the transaction is performed and the result of the transaction is sent back to the master. If it is determined that it is speculative then it is determined if the system is in a low power mode or not. If it is not then as in the case of a non-speculative request the transaction is performed. If it is in a low power mode the transaction is cancelled and a response indicating the transaction to be cancelled is sent to the master.

Figure 4:
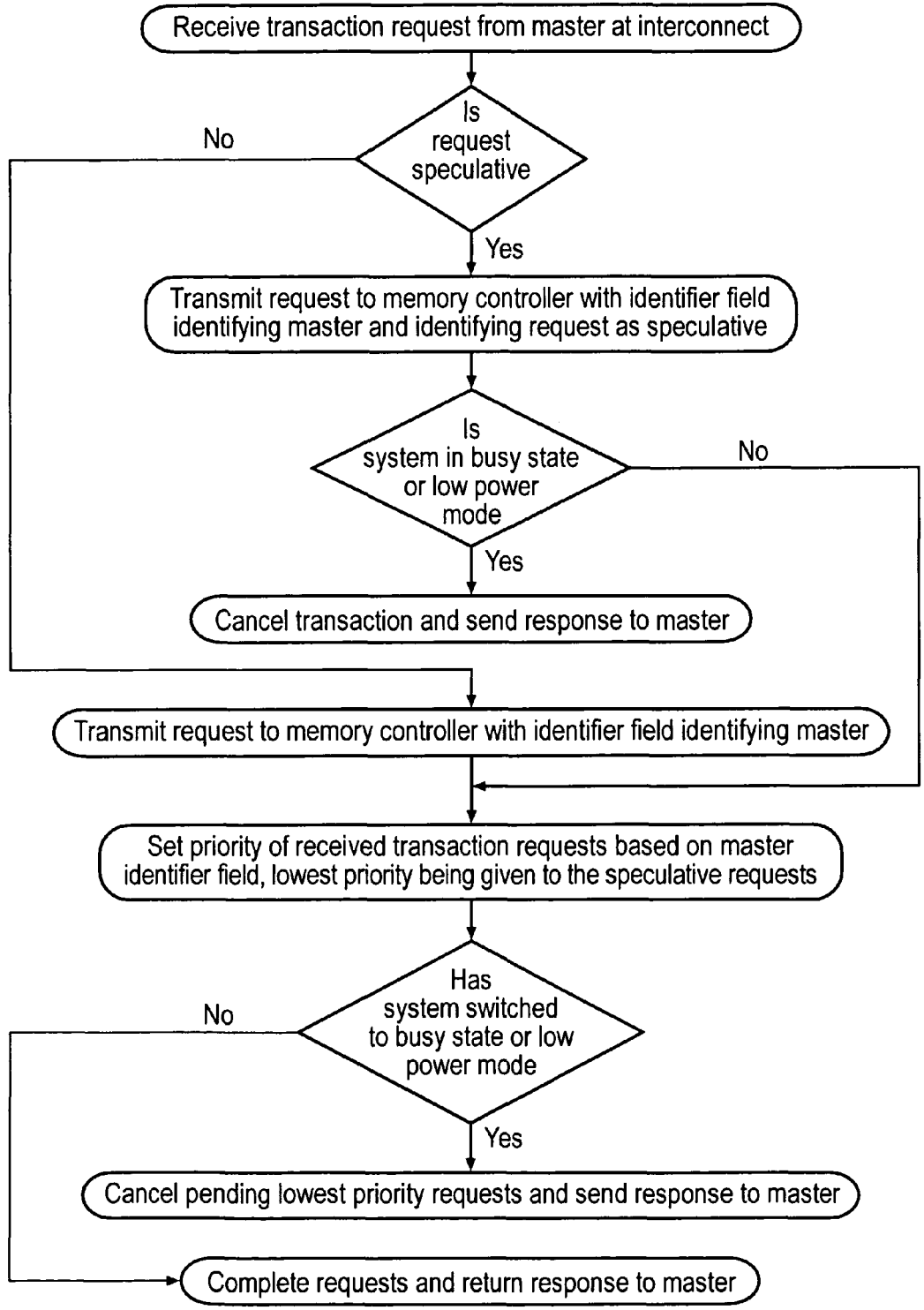
FIG. 4 shows a flow diagram indicating the steps performed by an interconnect and memory controller according to an embodiment of the present invention.

FIG. 4 shows an alternative embodiment of a method according to an embodiment of the present invention. In this embodiment, the transaction request for the master is received at an interconnect and determination is made to see if it is speculative or not. If it is then a request is transmitted to the memory controller with an identifier field identifying the master and identifying the request as speculative. It is then determined if the system is in a busy state or in a low power mode. If it is in either of these then the transaction is cancelled and a response indicating this is sent to the master. If the request is not speculative then the request is transmitted to the memory controller with an identifier field identifying the master. At this point the priority of the received transaction is set based on the master identifying field. Similarly if the system is not busy and in a high power mode then the speculative instruction that is sent to the memory controller also has its priority set at this point. In this case, the lowest priority will be given to this request as it is a speculative request.

The requests then sit in a pending queue in their priority order and while they are in the pending queue it is determined if the system switches from a high power non-busy state to a busy state or to a low power mode. In response to detecting that it switches to one of these states the queue is analysed to see if it is longer than a predetermined length and if it is then the excess pending transactions with the lowest priority are cancelled to bring the queue down to the required length. A response to the master is sent indicating that these pending instructions have been cancelled. If the system does not switch while they are in the pending queue then the transactions are executed and the result is returned to the master. Alternatively, in some embodiments on switching to one of these states rather than cancelling pending instructions to produce a queue of a certain length, all of the pending transactions that have the lowest priority and are therefore speculative, are cancelled.

Figure 5:
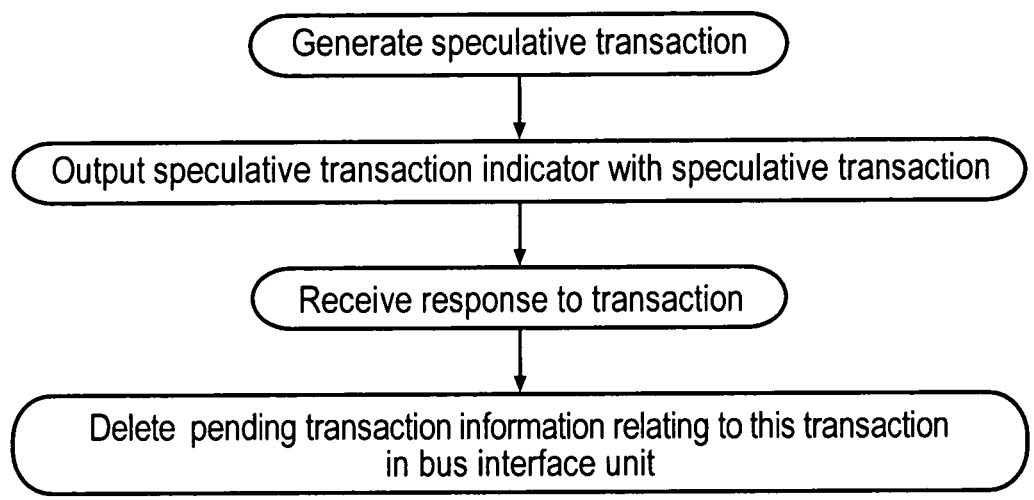
FIG. 5 shows a flow diagram indicating the steps performed by a master according to an embodiment of the present invention.

FIG. 5 shows a flow diagram indicating steps performed by a master. The master generates a speculative transaction and this is output along with a transaction indicator indicating that the transaction is speculative. The master then waits for a response to the transaction. In response to a response to the transaction which may be either that the transaction is completed or that it has been deleted the pending transaction information relating to that transaction that is stored in the bus interface unit is deleted.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

We claim:

1. Circuitry in a data processing apparatus, said circuitry for receiving transaction requests from a plurality of masters, said circuitry comprising:
   a port for receiving said transaction requests, at least one of said transaction requests received comprising an indicator indicating if said transaction is a speculative transaction;
   a port for outputting a response to said master said transaction request was received from; and
   transaction control circuitry, responsive to a speculative transaction request, configured to determine a state of at least a portion of said data processing apparatus said circuitry for receiving transaction requests is operating within, and responsive to said state being a predetermined state, said transaction control circuitry is configured to generate and output a transaction cancel indicator, said transaction cancel indicator indicating to said master that said speculative transaction will not be performed.

2. The circuitry according to claim 1, said predetermined state being a low power state.

3. The circuitry according to claim 2, wherein said circuitry comprises a register for storing a low power indicator, said circuitry determining said state of said data processing apparatus in response to a value stored in said register.

4. The circuitry according to claim 2, wherein said circuitry comprises an input from a power controller said input being adapted to receive a signal indicating a power state of said data processing apparatus, said circuitry determining said state of said data processing apparatus in response to said power state signal received from said power controller.

5. The circuitry according to claim 1, said predetermined state being a busy state.

6. The circuitry according to claim 1, wherein said predetermined state is dependent upon a power state of said circuitry and an activity state of said circuitry, said circuitry comprising a plurality of power states and a plurality of activity states, said predetermined state comprising a low power state, a high activity state and a combination of a lower power state and a higher activity state.

7. The circuitry according to claim 1, wherein said circuitry comprises an interconnect.

8. The circuitry according to claim 1, wherein said circuitry comprises a memory controller.

9. The circuitry according to claim 8, wherein said memory controller comprises a pending queue of pending transactions, said data processing apparatus being in said busy state when said queue comprises at least one of more than a predetermined number of transactions and more than a further predetermined number of non-speculative transactions in said pending queue.

10. The circuitry according to claim 8, wherein in response to said state not being said predetermined state said memory controller provides said speculative transaction request with a low priority status and puts said transaction in said pending queue in a position dependent upon its priority and in response to said state changing to said predetermined state while said speculative request is still in said queue, said memory controller cancels said transaction and generates said transaction cancel indicator and outputs said transaction cancel indicator to said master.

11. The circuitry according to claim 8, wherein said memory controller is responsive to said speculative transaction request and to said state being said predetermined state to open a row in said memory comprising an address to be accessed by said speculative transaction request and to cancel said transaction and to generate said transaction cancel indicator.

12. A master for generating speculative and non-speculative transaction requests and for generating a speculative indicator to indicate requests that are speculative, said master comprising a bus interface unit and an output port for outputting said requests, said speculative requests being output with said speculative indicator, said master comprising a port for receiving a response to said requests, said master being responsive to a response indicating said speculative request has been cancelled to delete said data relating to said cancelled transaction request from said bus interface unit.

13. A master according to claim 12, wherein said speculative indicator is output from said master as part of a field identifying said master.

14. A data processing apparatus comprising at least one master for generating speculative and non-speculative transaction requests and for generating a speculative indicator to indicate requests that are speculative, said master comprising a bus interface unit and an output port for outputting said requests, said speculative requests being output with said speculative indicator, said master comprising a port for receiving a response to said requests, said master being responsive to a response indicating said speculative request has been cancelled to delete said data relating to said cancelled transaction request from said bus interface unit, circuitry according to claim 1 and an interface connecting said at least one master and said circuitry.

15. A data processing apparatus according to claim 14, wherein said interface comprises at least one sideband signal line for communicating said transaction cancel indicator to said at least one master.

16. A data processing apparatus according to claim 14, wherein said transaction cancel indicator comprises a predetermined encoding transmitted via said interface.

17. A data processing apparatus according to claim 14, wherein said circuitry comprises a memory controller and said data processing apparatus further comprises a memory, access to said memory being controlled by said memory controller.

18. A data processing apparatus according to claim 14, wherein said circuitry comprises a memory controller comprising a pending queue of pending transactions, said data processing apparatus being in said busy state when said queue comprises more than a predetermined number of transactions in said pending queue, and said speculative indicator being output from said master as part of a field identifying said master, said memory controller being responsive to said master identifier field to generate a priority for said transaction request received, and being responsive to said master identifier field indicating a speculative transaction to generate a lowest priority for said transaction and to place said transaction request in said pending queue in a position that is dependent upon said priority generated.

19. A data processing apparatus according to claim 15, wherein said interface comprises a further sideband signal line for communicating said speculative transaction indicator as a sideband signal to said transaction request.

20. A method of controlling the processing of speculative transactions comprising the steps of:
generating a speculative transaction request;
transmitting said transaction request along with an indicator indicating that said transaction request is speculative;
receiving said transaction request and said indicator;
determining a state of a data processing apparatus for processing said transaction; and
in response to said state being a predetermined state generating a transaction cancel indicator and outputting said transaction cancel indicator as a response to said transaction; and
in response to said state not being said predetermined state performing said transaction and outputting a result of said transaction.

* * * * *